United States Patent [19]

Weng et al.

[11] Patent Number: 5,428,976
[45] Date of Patent: Jul. 4, 1995

[54] STEERING LOCK

[76] Inventors: Tien-Tsair Weng, No. 17-2, Chung-Jung Tsun, An-Ting Hsiang, Tainan Hsien; Yang-Hui Cheng, Kang Tzu Wei No. 94, Kang-Wei Tsun, An-ting Hsiang, Tainan Hsien, both of Taiwan

[21] Appl. No.: 242,010

[22] Filed: May 12, 1994

[51] Int. Cl.⁶ .............................................. B60R 25/02
[52] U.S. Cl. ........................................ 70/209; 70/226
[58] Field of Search .............................. 70/201–203, 70/209–212, 225, 226, 237, 238

[56] References Cited

U.S. PATENT DOCUMENTS

| | | | |
|---|---|---|---|
| 3,828,593 | 8/1974 | Bolton | 70/209 |
| 5,163,309 | 11/1992 | Wu | 70/209 |
| 5,168,732 | 12/1992 | Chen et al. | 70/209 |
| 5,347,836 | 9/1994 | Chen | 70/209 |

*Primary Examiner*—Peter M. Cuomo
*Assistant Examiner*—Suzanne L. Dino
*Attorney, Agent, or Firm*—Varndell Legal Group

[57] ABSTRACT

A steering lock, which includes a casing for mounting on an inner periphery of a steering wheel, having a front track and a rear track separated by an arched mounting hole, a lock cylinder at the front, and a steel ball supported on a spring in a hole within the rear truck. A constraint bar is fixed to the casing for abutting the instrument panel of an automobile. A slide block is adapted to slide between the front and rear tracks and guided by a guide screw on the casing. The slide block has a recessed hole which receives the latch bolt of the lock cylinder when the steering lock is locked or the steel ball when the steering lock is unlocked.

5 Claims, 6 Drawing Sheets

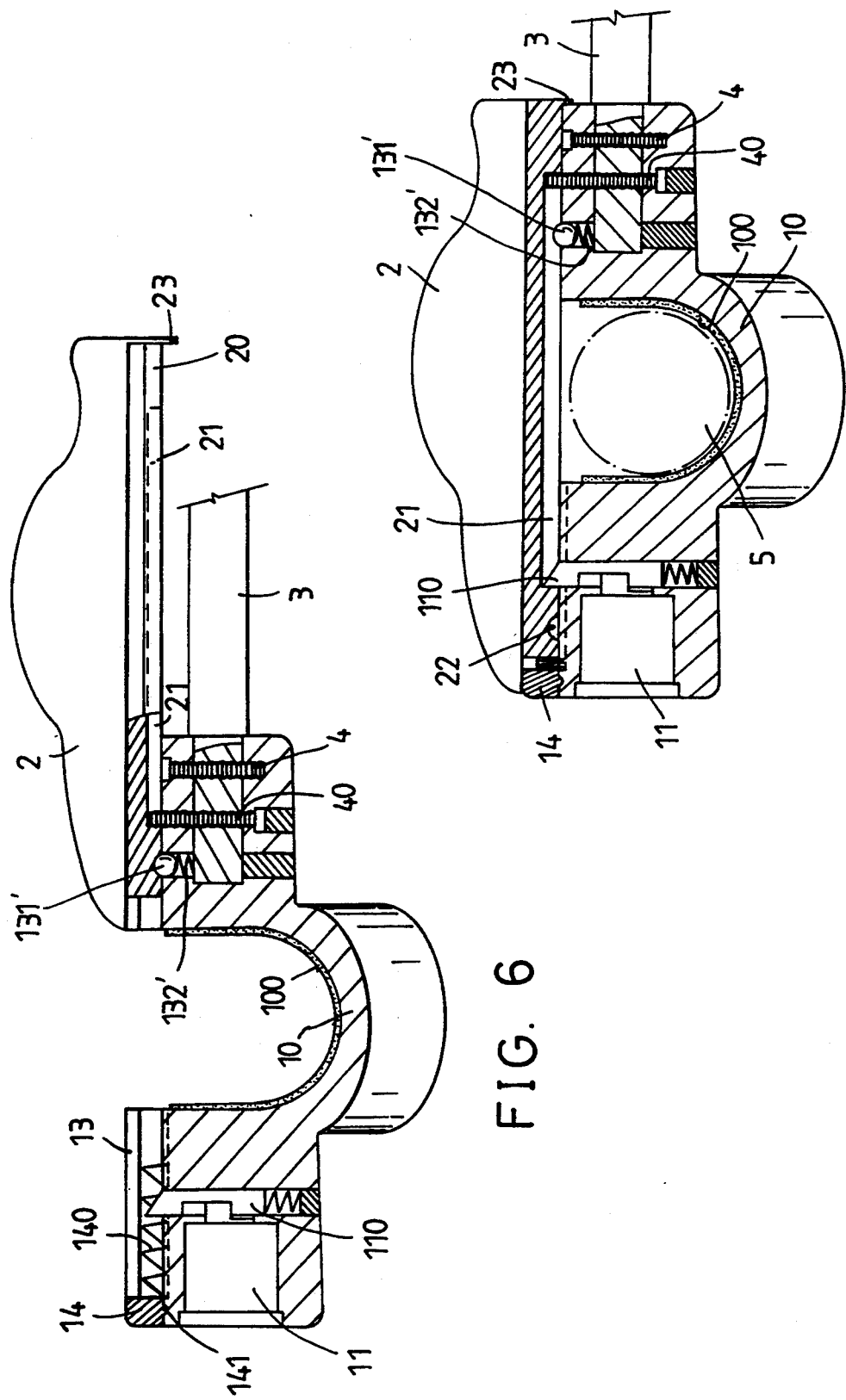

STEERING LOCK

BACKGROUND OF THE INVENTION

The present invention relates to a steering lock for locking the steering wheel of a motor vehicle.

Various automobile locking devices are known and intensively used for locking the steering wheel or gear shift lever. FIG. 1 shows a steering lock according to the prior art, which comprises a substantially T-shaped mounting frame fastened to the periphery of the steering wheel by the shackle of a lock body, and a constraint bar having one end connected to the lock body and an opposite end stopped at the instrument panel of the automobile. This structure of steering lock is not satisfactory in function because it cannot protect against the use of a hammer and bar and can be easily destroyed by burglars.

SUMMARY OF THE INVENTION

The present invention provides a steering lock which eliminates the aforesaid problem. It is one object of the present invention to provide a steering lock which protects against the use of a hammer and bar. It is another object of the present invention to provide a steering lock which can be automatically retained at the unlocked position for the next locking operation when it is unlocked. It is still another object of the present invention to provide a steering lock which is easy to operate. It is still another object of the present invention to provide a steering lock which is durable in use.

To achieve the aforesaid objects, there is provided a steering lock comprised of a casing, a slide block fastened to the casing and locked in the locking position permitting the casing to be firmly retained to the steering wheel to be locked, and a constraint bar extended from the casing for abutting the instrument board panel of the motor vehicle. The casing has a front track and a rear track separated by an arched mounting hole, a lock cylinder at the front controlled to lock the slide block in the locking position, and a steel ball supported on a spring in a hole within the rear track to hold the slide block in the rear track when the steering lock is unlocked. The slide block is guided by a guide screw and moved between the front and rear tracks, having a recessed hole which receives the latch bolt of the lock cylinder when the steering lock is locked or the steel ball when the steering lock is unlocked. The slide block further comprises a rear bumper transversely disposed at the back thereof to protect against insertion of a bar into the rear track when removing the slide block from the casing.

BRIEF DESCRIPTION OF THE DRAWINGS

FIG. 6 is a sectional view showing the steering lock of the present invention unlocked;

FIG. 7 is a sectional view showing the steering lock of the present invention locked.

DETAILED DESCRIPTION OF THE PREFERRED EMBODIMENT

Figure 1:
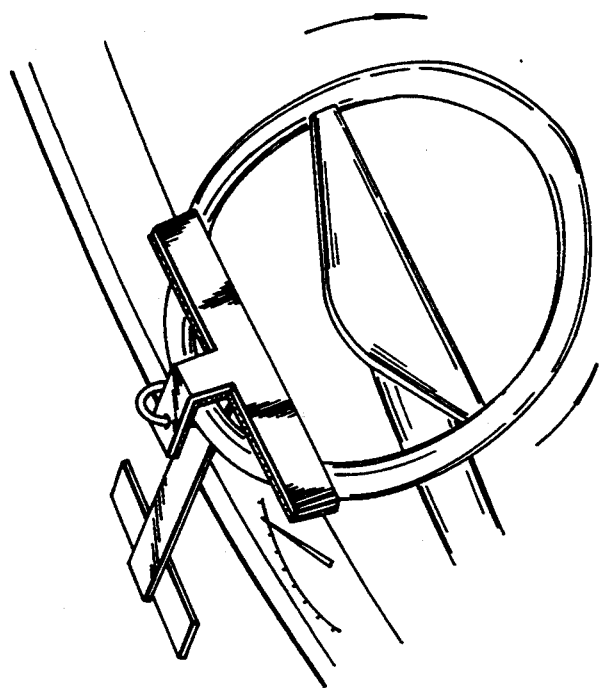
FIG. 1 is an installed view of a steering lock according to the prior art.
Figure 2:
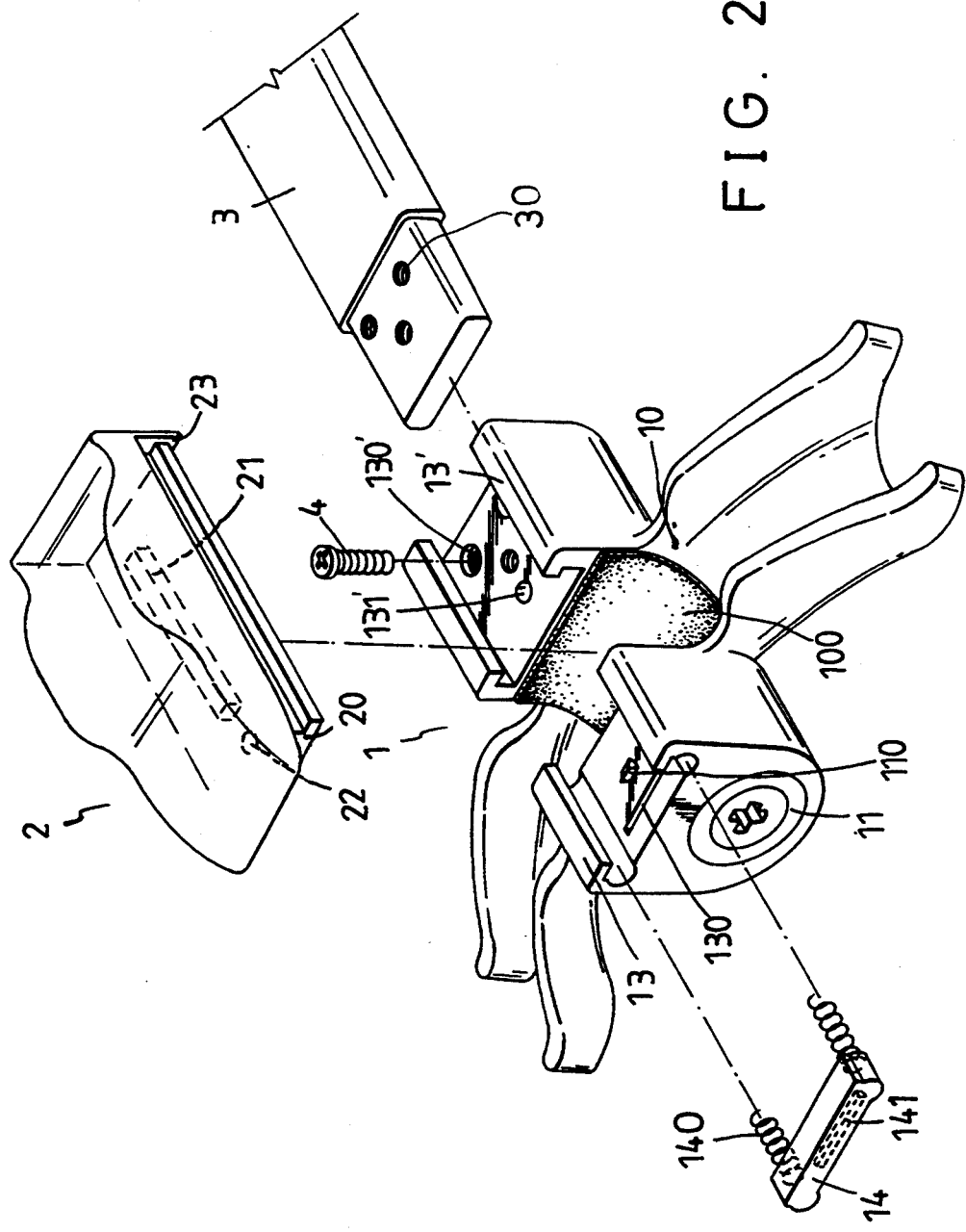
FIG. 2 is an exploded view of a steering lock according to the present invention.
Figure 3:
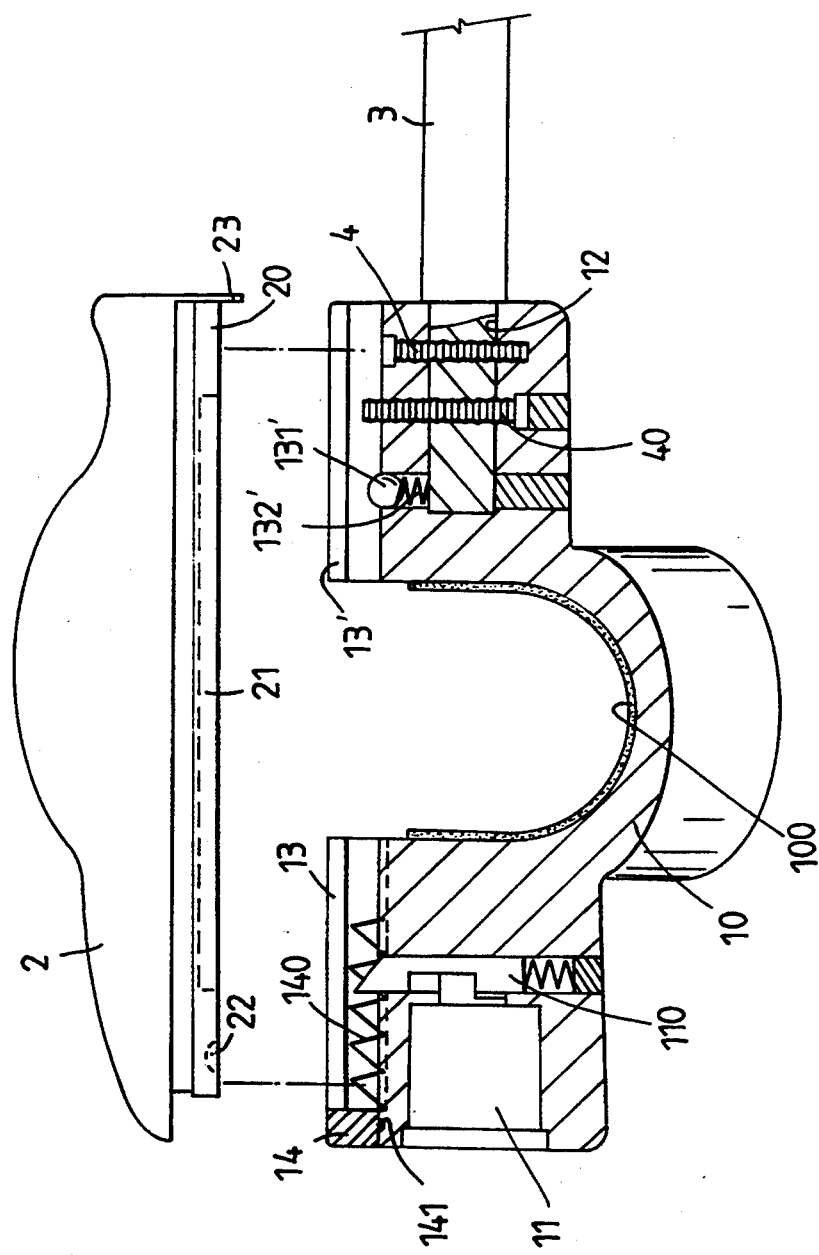
FIG. 3 is a side view in section of the steering lock shown in FIG. 2.

Referring to FIGS. 2 and 3, a steering lock in accordance with the present invention is generally comprised of a casing 1, a slide block 2, and a constraint bar 3.

Figure 4:
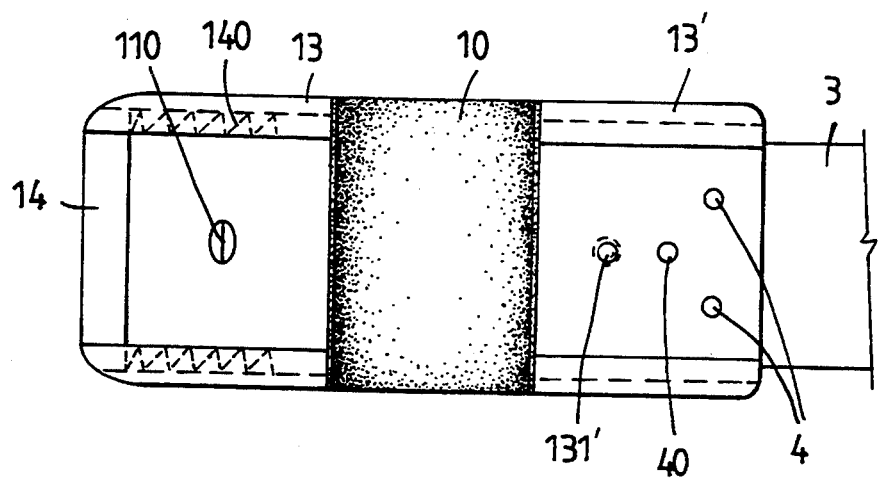
FIG. 4 is a plain view of the casing of the steering lock shown in FIG. 2.
Figure 5:
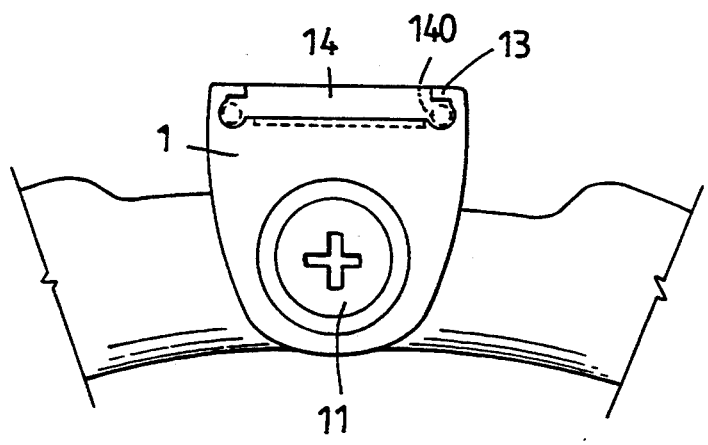
FIG. 5 is a front view of the casing of the steering lock shown in FIG. 2.
Figure 8:
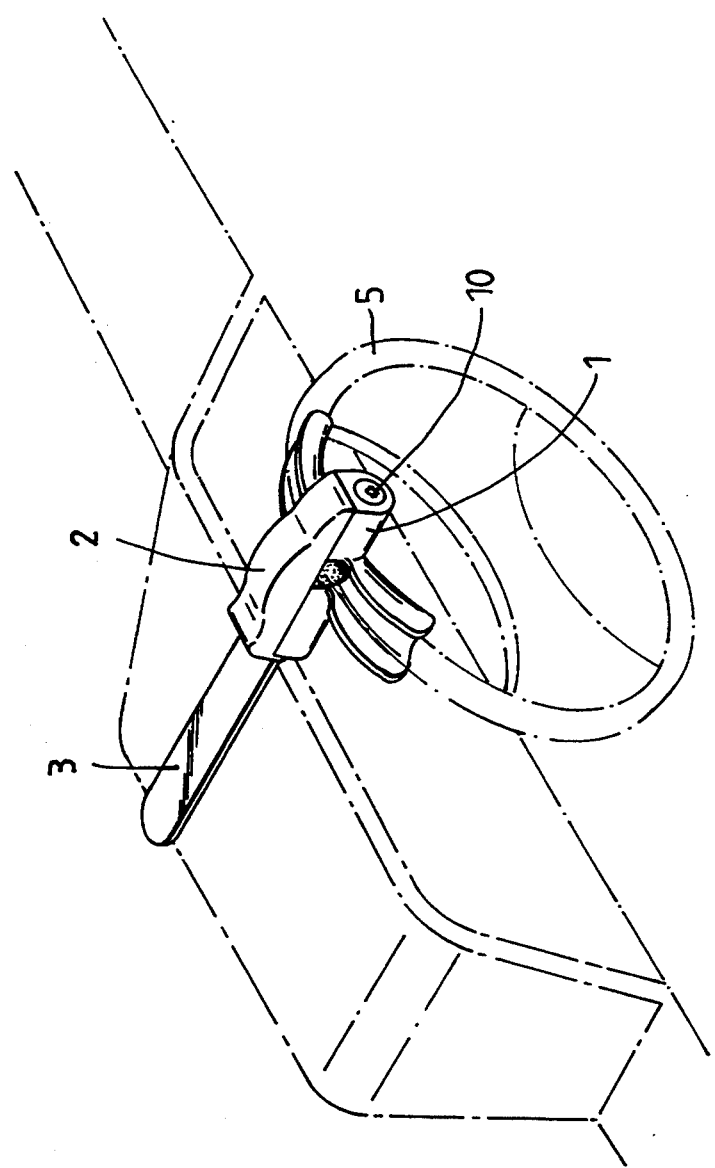
FIG. 8 is an installed view showing the steering lock of the present invention fastened to the steering wheel and locked.

The casing 1 comprising an arched mounting hole 10 transversely disposed at the top in the middle for receiving the periphery of the steering wheel 5 to be locked (see FIG. 8). The periphery of the arched mounting hole 10 is covered with a cushion 100. The cushion 100 can be compressed when the casing 1 is fastened to the periphery of the steering wheel 5 and locked. Therefore, the arched mounting hole 10 can fit a variety of steering wheels. The casing 1 is divided by the arched mounting hole 10 into two opposite parts, namely, the front part and the rear part. A lock cylinder 11 is fastened to the front end of the front part of the casing 1 in the center. A rectangular hole 12 is made on the rear end of the rear part of the casing 1 in the center to hold one end of the constraint bar 3. The casing 1 further comprises a front track 13 and a rear track 13' respectively disposed on the front and rear parts thereof at the top and longitudinally aligned for the sliding of the slide block 2 (see FIGS. 4 and 5). A transverse groove 130 is made on the front part of the casing 1 at the top and disposed within the front track 13 for mounting a locating block 14. The locating block 14 has a bottom rib 141 fitted into the transverse groove 130, and two springs 140 bilaterally disposed in the front track 13. The rear part of the casing 1 comprises a plurality of screw holes 130' at the top within the rear track 13'. A steel ball 131' is supported on a spring 132' in a hole (not shown) on the top of the rear part of the casing 1 within the rear track 13'.

The slide block 2 comprises a flat bottom rail 20 made to slide in and out of the front and rear tracks 13 and 13', and a rear bumper 23 transversely disposed at the back. The bottom rail 20 of the slide block 2 has a longitudinal bottom groove 21 and a recessed hole 22 in the front of the longitudinal bottom groove 21.

The constraint bar 3 is a narrow flat bar, having a front end received in the rectangular hole 12 on the rear part of the casing 1 and then fixed in place by threading screws 4 into the screw holes 130' on the rear part of the casing 1 and respective screw holes 30 on the front end of the constraint bar 3. When the bottom rail 20 of the slide block 2 is inserted into the rear track 13', a guide screw 40 is threaded into a bottom screw hole (not shown) on the casing 1 with the end projecting into the longitudinal groove 21 to guide the movement of the slide block 2 in the tracks 13 and 13'. When the slide block 2 is disposed in the rear track 13', the steel ball 131' engages the recessed hole 22 on the bottom rail 20 to retain the slide block 2 in the unlocked position (see FIG. 6).

Referring to FIG. 7, when the slide block 2 is moved into the front track 13 to compress the springs 140 of the locating block 14, the latch bolt 110 of the lock cylinder 11 is driven out of a hole (not shown) on the top of the front part of the casing 1 and inserted into the longitudinal groove 21 on the bottom rail 20 of the slide block 2, and therefore the slide block 2 is locked in the locking position. Because the guide screw 40 is perpendicularly inserted into the longitudinal groove 21 on the bottom rail 20 of the slide block 2, the movement of the slide block 2 in the tracks 13 and 13' is limited within a fixed range, and therefore the locating block 14 will not be damaged when the slide block 2 is pushed into the locking position. When locked, the rear bumper 23 of the slide block 2 and protects blocks up the gap between the casing 1 and the slide block 2 against the insertion of a bar. When the latch bolt 110 is released from the bottom rail 20 of the slide block 2, the springs 140 automatically push the slide block 2 away from the front track 13. When the slide block 2 is moved back to the rear track 13' by the springs 140, the guide screw 40 abuts the front end of the longitudinal groove 21, causing the steel ball 131' to engage the recessed hole 22 again, and therefore the slide block 2 is retained in the unlocked position.

Furthermore, the front track 13 defines two cylindrical receiving spaces at two opposite sides in the longitudinal direction respectively fitting the outer diameter of the springs 140. Therefore, the spring 140 can be compressed in the longitudinal direction and will not be tilted when compressed (see also FIG. 5).

We claim:

1. A lock for a steering wheel of a motor vehicle comprising a casing fastened to an inner periphery of said steering wheel, a slide block for fastening to said casing about an outer periphery of the steering wheel, and a constraint bar having a front end fixed to said casing and a rear end abutting an instrument panel of said motor vehicle, said casing having a top, a middle, a front part and a rear part; an arched mounting hole transversely arranged in both said top and said middle for receiving said inner periphery of said steering wheel, a front track and a rear track longitudinally arranged at said top of said casing respectively in said front and rear parts and separated by said arched mounting hole, a locating lock transversely fixed to a front end of said front track, two springs perpendicularly connected to opposite ends of said locating block and inserted into said front track, a lock cylinder arranged within said front part, a latch bolt driven by said lock cylinder to move in and out of a hole within said front track for locking said slide block in a locked position, said rear part having a rectangular slot receiving a front end of said constraint bar, said constraint bar secured to said rear part within said rectangular slot by screws, said rear track having a middle with a vertical screw hole perpendicularly arranged therein, a guide screw threaded in said vertical screw hold and having a tip projecting into said rear track, said rear track further having a recessed hole receiving a steel ball supported by a spring, and said slide block including a bottom with a flat rail slidably received in said front and rear tracks, said flat rail having a longitudinal groove receiving said tip of said guide screw, a recessed hole arranged in a front of said bottom groove receiving said latch bolt when said lock is locked or said steel ball when said lock is unlocked.

2. The steering lock of claim 1, wherein said longitudinal groove of said flat rail of said slide block has two opposite ends alternatively abutting said tip of said guide screw permitting said slide block to be retained between said locked position or said unlocked position.

3. The steering lock of claim 1, wherein when said slide block is moved away from said front track and said arched mounting hole back to said rear track, said steel ball immediately engages said recessed hole on said flat rail to hold said slide block in said unlocked position.

4. The steering lock of claim 1, wherein said slide block further comprises a rear end with a transversely disposed bumper for preventing insertion of a bar into said rear track.

5. The steering lock of claim 1, wherein said front track includes two cylindrical spaces at opposite sides thereof arranged in a longitudinal direction, said spaces respectively receiving said springs on said locating block permitting said springs to be compressed longitudinally when said slide block is moved into said locked position on said front track.

* * * * *